(36.)
SAMUEL G. CABELL.
Improvement in Fluting Machines.
No. 4,653. Reissued Nov. 28, 1871.
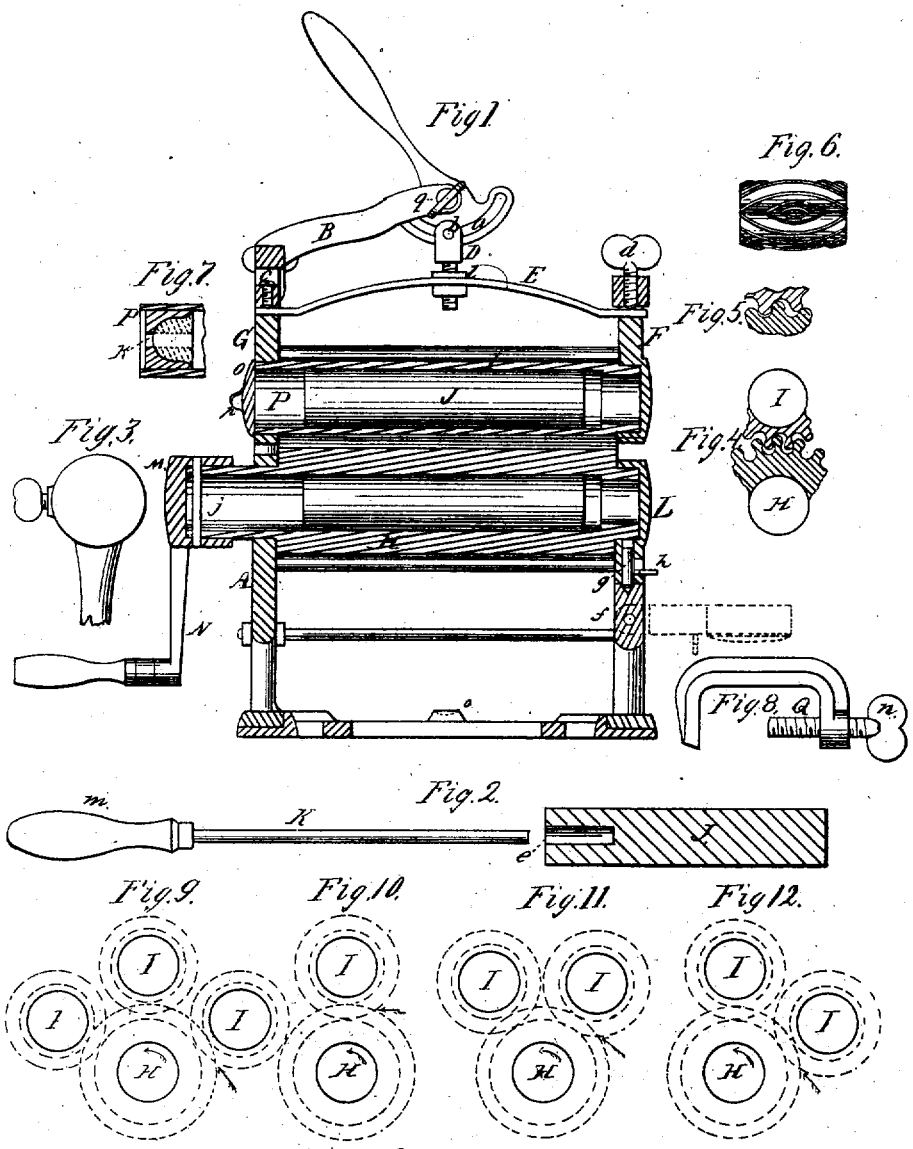
Witnesses,
J. J. Coombs
T. M. Coombs
S. G. Cabell Inventor
AM. PHOTO-LITHOGRAPHIC CO. N.Y. (OSBORNE'S PROCESS.)

UNITED STATES PATENT OFFICE.

SAMUEL G. CABELL, OF QUINCY, ILLINOIS, ASSIGNOR, BY MESNE ASSIGNMENTS, TO FLORA B. CABELL AND SUSAN R. KNOX.

IMPROVEMENT IN FLUTING-MACHINES.

Specification forming part of Letters Patent No. 83,924, dated November 10, 1868; reissue No. 4,653, dated November 28, 1871.

*To all whom it may concern:*

Be it known that I, SAMUEL G. CABELL, of Quincy, in the county of Adams and State of Illinois, have invented certain new and useful Improvements in Fluting-Machines; and I do hereby declare that the following is a full, clear, and exact description of the same, reference being had to the accompanying drawing making part of this specification, and to the letters of reference marked thereon, like letters indicating like parts wherever they occur.

To enable others skilled in the art to construct and use my invention, I will proceed to describe it.

My invention relates to fluting-machines for fluting articles of dress worn by ladies; and consists in the novel construction and arrangement of certain mechanical contrivances for raising, supporting, depressing, and adjusting the fluted hollow cylinders, in covering their front ends in a novel manner, and in providing them with flutes of a peculiar shape, &c.

In the drawing, Figure 1 is a vertical longitudinal section of my machine. Fig. 2 is a longitudinal vertical section of the heating-iron and the rod, with handle attached for convenience in using it. Fig. 3 is a front view of the cap end of the crank detached. Fig. 4 is a cross-section of the cylinders, showing the form of their fluting. Figs. 5 and 6 are views of modifications of the form of fluting. Fig. 7 is a vertical section of the end of a cylinder and a thimble inserted. Fig. 8 is a plan view of the clamp, and Figs. 9, 10, 11, and 12 are end views, showing different ways of grouping different numbers of fluted cylinders.

In constructing my machine I make a frame, A, arranging its front end so as to receive another frame, G, and allow it to move vertically between its sides. The sides of the frame G may be concave, and slide along correspondingly-convex sides of the frame A for the purpose of allowing a vertical and preventing a lateral movement of the same. To the rear end of the frame A, which extends only a short distance up from the base, as shown in Fig. 1, I pivot a cap, L, at *f*, provided on its inner side with an annular recess to serve as a journal-box for the end of the cylinder H. The lower end or shank of the cap L is slotted, and pivoted to the frame A by the pin *f*, and is locked in position by a small bolt, *g*, arranged to be moved vertically and enter a recess in the upper end of the frame, as shown in Fig. 1. The bolt *g* I move by means of a pin, *h*, attached to it and projecting through a small slot in the lower part of the cap L, as shown in the same figure. The hollow fluted cylinder H I mount in position with its rear end having its bearings in the annular recess of the cap L and its front end in the frame A, as shown in Fig. 1, and projecting far enough beyond it to allow the cap M of the crank N to be fitted to it, as shown in the same figure. The cap M, forming a part of the crank N, is made so as to fit easily over the end of the cylinder H, and may be fastened by a thumb set-screw, *i*, or a pin, *j*, or by any other suitable device, as shown in Figs. 1 and 3. The upper end of the front side of the frame A I provide with an arm, B, which is rigidly connected to it, and extends about half way between the front and rear of the frame A, as shown in Fig. 1; and to its extreme end I pivot a lever, C, made with a cam-shaped head having an eccentric slot, *a*. The head of the lever C I connect with a bolt, D, by means of a pin, *b*, passing through the head of the bolt and eccentric slot *a* in such a way as to allow the head of the lever to move backward and forward, and giving a vertical motion to the bolt D, the shank of which has a screw-thread cut upon it, and passes loosely through a hole in the spring cross-bar E, to which it is connected by two nuts, *l*, one on the upper and one on the lower side of the bar E, as shown in Fig. 1, so as to allow a vertical adjustment of the bolt D. One end of the bar E is connected to the frame G, arranged to move vertically in the front end of the frame A, by passing into a slot provided for the purpose, and being fastened there by a set-screw, *c;* and the other end is connected to a cap-plate, F, provided with an annular recess or recesses on its inner side, by passing into a similar slot, and being fastened by a thumb set-screw, *d*, as shown in Fig. 1. In the frame G and cap-plate F I mount a hollow fluted cylinder or cylinders with their front ends in bearings in frame G and their rear ends in the annular recess of the cap F, as shown in Fig. 1. The cylinders H and I, when in position, have placed in their chambers a hot iron, J, through their open front ends. When the hot iron J is in place the cap M of the crank completely closes the end of the cylinder H. The end of the cylinder I, I close either with a door, O, arranged to swing vertically on the smooth neck of a screw connecting it to the frame G a little on one side of the open end of the cylinder, and when closing or covering the end of the cylinder resting on or against a lug suitably located for the purpose, or by inserting a thimble, P, having a small opening, *k*, in its head, (for the purposes hereinafter explained,) as shown in Fig. 7. The irons J have in their front ends a circular hole, *e*, of any suitable depth, for the insertion of the rod K, having a handle, *m*, so that when heated they may be conveniently handled and readily placed in or removed from the cylinders by the use of this rod.

My machine thus constructed can be fastened on the edge of a table by the use of a clamp, Q, shown in Fig. 8. The thumb set-screw *n* of this clamp is intended to bear against the lug *o* on the base of the frame A, as shown in Fig. 1.

The cylinders H and I are fluted, as shown in Fig. 4. The flutes or grooves swell at their base, and thus give a form of peculiar beauty to articles that may be fluted by them. I also flute the cylinders in the form shown in Fig. 5, and, when desired, run the fluting spirally, as shown in Fig. 6.

In operating my machine, I attach it where desired to be used by the clamp Q; then heat the irons J and introduce them by means of the rods K into the chambers of the cylinders, and close up the open end of the cylinder H by attaching the crank N, and of the cylinders I by turning their covers O, or by the insertion of the thimbles P. The covers O are turned by means of an ear, *p*. The thimbles P have a circular opening, *k*, in their heads, through which the rod K may be passed, both for convenience in introducing or removing the thimbles, as well as the hot iron J. The cylinders I are then adjusted to the cylinder H, as may be desired, by adjusting the bolt D with the nuts *l*. Now, as the bolt D is firmly attached to the spring-bar E, which is connected with the vertically-moving frame G and cap F, in which the cylinders I are mounted, it is obvious that as the lever C is moved it will, by means of the eccentric slot *a*, give a vertical motion to the bolt D and all its connections, and consequently to the cylinder or cylinders I, and will hold said cylinder or cylinders away from the stationary cylinder H until let down by another movement of the eccentric head of the lever C. The articles sought to be fluted are passed between the cylinders, motion being given to the cylinder H by the crank N, which in turn gives motion to the others. When pressure is required it is only necessary to bear down on the lever C, and the lever may be held in any desired position by means of the thumb-screw *q*, which, being constructed with a shoulder just under its head and having a screw cut on its end, serves both as a pivot for the lever C as well as to fix it firmly in any position desired.

It is obvious that a single adjustable cylinder, I, may be mounted in the frame G and cap F, as shown and arranged in Fig. 10; or there may be two or three adjustable cylinders I, $I^1$, and $I^2$, mounted in a similar manner, by providing the frame G with the requisite number of openings, and the cap-plate F with a corresponding number of annular recessed caps, and that they may be arranged as shown in Figs. 9, 11, and 12. I make my machine usually with three adjustable cylinders, arranged as shown in Fig. 9.

The construction of my machine is such that it can be readily taken apart and the whole or a portion of the cylinders removed. If the whole are removed other cylinders may be mounted with a different style of fluting. In order to do this it is only necessary to remove the crank N, then to raise the bolt *g* by the pin *h* and swing back the cap L, as shown in dotted lines in Fig. 1, which releases the cylinder H. The cylinders I I′ I″ may be removed by turning the thumb-screw *d* and releasing the bar E, when the cap-plate F can be taken off. In this way it will be seen my machine may readily be taken apart, and in like manner put together, and that at the same time a part of the cylinders may be removed and others with a different style of fluting be substituted.

Having thus described my invention, what I claim is—

1. The cap-plate F, when constructed and arranged substantially as herein described, for the purpose of furnishing a support and bearing for the cylinder or cylinders I, as set forth.

2. In combination with a stationary fluted cylinder and one or more movable fluted cylinders, a lever and eccentric for raising, holding in position, and depressing the movable cylinder or cylinders, constructed and arranged to operate substantially as and for the purpose described.

3. The cap L and bolt *g*, when constructed and arranged to operate substantially as herein described, and for the purpose set forth.

4. In combination with the cylinder H, the cap M on the end of the crank N, constructed substantially as herein described, and for the purpose set forth.

5. In combination with the cylinders I, the covers O and thimbles P, when constructed and arranged substantially as described, and for the purpose set forth.

6. The fluting-rolls for fluting-machines, constructed with ogee-fluting of the form herein described, and shown in Figs. 4 and 5.

SAMUEL G. CABELL.

Witnesses:
J. J. COOMBS,
JOS. L. COOMBS.

(38)